(12) United States Patent
Someno et al.

(10) Patent No.: US 6,581,269 B2
(45) Date of Patent: Jun. 24, 2003

(54) RING FOR LAMINATED TYPE METAL BELT AND METHOD FOR MANUFACTURING SAME

(75) Inventors: Shinji Someno, Kanagawa-ken (JP); Masayuki Suzuki, Kanagawa-ken (JP)

(73) Assignee: Nissan Motor Co., Ltd., Kanagawa-ken (JP)

(*) Notice: Subject to any disclaimer, the term of this patent is extended or adjusted under 35 U.S.C. 154(b) by 0 days.

(21) Appl. No.: 09/791,762

(22) Filed: Feb. 26, 2001

(65) Prior Publication Data

US 2001/0016974 A1 Aug. 30, 2001

(30) Foreign Application Priority Data

Feb. 29, 2000 (JP) .................................... 2000-052824

(51) Int. Cl.⁷ .............................................. B23P 13/04
(52) U.S. Cl. ..................... 29/558; 474/202; 83/863
(58) Field of Search .................. 29/412, 415, 558; 474/202; 83/676, 863, 869, 872, 875, 886, 887; 225/5; 72/203, 204

(56) References Cited

U.S. PATENT DOCUMENTS

| 4,370,910 A | * | 2/1983 | Suzuki et al. ................ 72/203 |
| 4,649,780 A | * | 3/1987 | Takeuchi et al. .............. 83/875 |
| 4,661,089 A | * | 4/1987 | Cuypers ..................... 156/137 |
| 5,458,269 A | * | 10/1995 | Loomis ......................... 225/5 |
| 5,548,986 A | * | 8/1996 | Matsuo et al. ................ 72/204 |
| 6,431,067 B1 | * | 8/2002 | Annoura ..................... 101/454 |

FOREIGN PATENT DOCUMENTS

| EP | 0950830 A1 | 10/1999 |
| JP | 60234151 | 11/1985 |
| JP | 61070245 | 4/1986 |
| JP | 61290257 | 12/1986 |

OTHER PUBLICATIONS

European Search Report dated Jun. 25, 2001.

* cited by examiner

Primary Examiner—David P. Bryant
(74) Attorney, Agent, or Firm—McDermott, Will & Emery

(57) ABSTRACT

A ring for a laminated type metal belt includes: an endless metal ring for configuring a belt by laminating a plurality of the rings. In the structure, the ring is chamfered at each of its inner and outer peripheral corner edges; and the radius of curvature of the chamfered portion of the inner peripheral corner edge of the ring is set to be larger than the radius of curvature of the chamfered portion of the outer peripheral corner edge of the ring.

8 Claims, 3 Drawing Sheets

RING FOR LAMINATED TYPE METAL BELT AND METHOD FOR MANUFACTURING SAME

BACKGROUND OF THE INVENTION

1. Field of the Invention

The present invention relates to a ring for a laminated type metal belt and a method for manufacturing the same, and in particular to a ring suitable for use as a metal belt element piece of a CVT (Continuously Variable Transmission) belt in a belt type CVT and a method for manufacturing the same.

2. Description of the Related Art

As well known, there is a trend where a metal-made CVT belt used as a transmission element of a belt type CVT is structured by connecting several hundreds of generally V-shaped metal blocks by an endless metal belt and a belt obtained by laminating thin plate-shape endless rings in several layers is used as the metal belt itself.

The above-mentioned ring is manufactured through not only a step where a coil member made of special steel such as maraging steel or the like is formed in an annular shape and it is connected at both end portions through welding to form a endless ring work material, a step where the ring work material is cut so as to have a predetermined width and a step where each of inner and outer corner peripheral edge portions of the cut ring work material is polished in a R chamfer shape while removing a burr generated at the time of cutting step, but also a rolling (plastic working) step, a heat treating step and the like.

A more specific process for cutting the ring is performed in the following manner. That is, a wide and endless ring work material is wound between a pair of rolls to be rotated around them while being applied with a predetermined tension. Meanwhile, a cutter is provided on one of the rollers coaxially therewith, and a cutter is provided on a pressing roll which is pressed to the one of the rollers. Then, the ring material is cut with shearing force between the cutters generated by applying a press force to the pressing roll and a ring with a predetermined width can be obtained.

SUMMARY OF THE INVENTION

In the above conventional manufacturing method, since a ring cutting method based on shearing is employed, it is impossible to avoid formation of a fracture surface on a sheared material face but also burr generation due to a special property of the method. Such a drawback factor as burr or the like can be removed to some extent by a polishing working at the subsequent step, but the burr may remain on the ring due to its size even after the polishing working. If the burr remains on the ring, there is a tendency that it acts as a trigger of ring damage, or the like due to metal fatigue or stress concentration so that the ring may be shortened.

Particularly, since a ring used in a CVT belt is circulated continuously between a pair of V-groove pulleys under an actually using state, a load acting on an outer peripheral side of the ring is larger than that acting on an inner peripheral side thereof, so that it is not allowable that the above drawback factor remains on the inner peripheral corner edges of the ring.

In view of the above, in the conventional art, it is assumed that a polishing work is performed on the outer peripheral corner edge portion of the ring and the inner peripheral corner edge portion thereof so as to form the same R chamfer shape, but it is necessary to perform the polishing working on the former and the latter independently in order to remove all of the drawback factors, which results in increase in manufacturing cost of the ring necessarily.

Also, when a cutting process where a ring is cut by cutting with whetstone instead of a shearing type cutter is employed, it is possible suppress generation of a drawback factor such as a burr largely. However, it is necessary to take in consideration a grinding margin corresponding to the width of the whetstone due to the special property of a whetstone in advance. As a result, material yield deteriorates extremely so that such a cutting process is not practical.

Also, when the whetstone is worn, it is necessary to replace it with another, which results in increase in manufacturing cost.

Furthermore, in a case that shearing of an endless ring is started at one point thereof and the shearing is performed over about one turn of the ring, when a portion of the endless ring which is positioned near to the one point and which has not been sheared yet is produced in a final stage where the shearing approaches to the one point, the portion is ruptured by a pressing force of the cutter. Accordingly, the fracture surface is formed over the entire fracture surface the portion of the ring which has not been sheared in the direction of the thickness. Furthermore, since the portion of the ring which is positioned near to the one point is plastically deformed by the pressing force of the cutter, deterioration of quality of the ring is caused.

The present invention has been achieved with such points in mind.

It therefore is an object of the present invention to provide a ring for a laminated type metal belt, whose life or durability is improved and a method which allows easy manufacture of the ring.

To perform the object, according to one aspect of the present invention, there is provided a ring for a laminated type metal belt which includes: an endless metal ring, the ring being for configuring a belt by laminating a plurality of the rings, wherein the ring is chamfered at each of its inner and outer peripheral corner edges; and the radius of curvature of the chamfered portion of the inner peripheral corner edge of the ring is set to be larger than the radius of curvature of the chamfered portion of the outer peripheral corner edge of the ring.

Another aspect is a method to manufacture a ring for a laminated type metal belt which includes the following steps: entraining a wide and endless ring work material between one roll provided with an indentation punch having an angle-shaped edge and anther roll to move the ring work material in a circulating manner; pressing a pressing roll on to the indentation punch so as to sandwich the ring work material; cutting the ring work material by indentation action of the indentation punch to obtain a ring with a predetermined width size; and performing a polishing working on inner and outer peripheral corner edge portions of the ring which has been cut. According the steps described above, the ring is chamfered at each of its inner and outer peripheral corner edges, and the radius of curvature of the chamfered portion of the inner peripheral corner edge of the ring is set to be larger than the radius of curvature of the chamfered portion of the outer peripheral corner edge of the ring.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCIRPTION OF THE PREFERRED EMBODIMENTS

Figure 1:
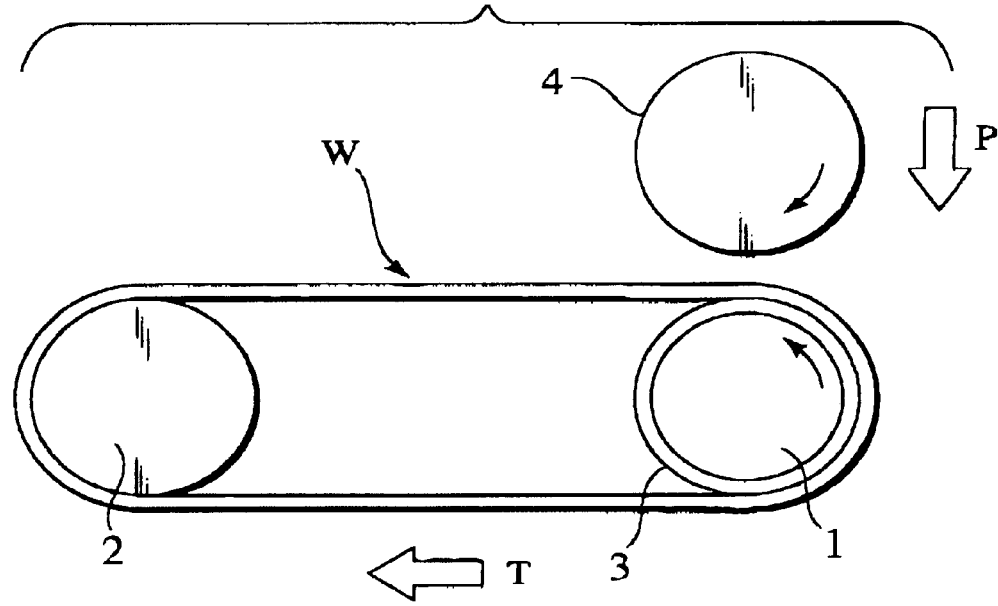
FIG. 1 is an explanatory diagram showing an outline of a ring cutting step according to a first embodiment of the present invention.

There will be detailed below the preferred embodiments of the present invention with reference to the accompanying drawings. Like members are designated by like reference characters.

Figure 2:
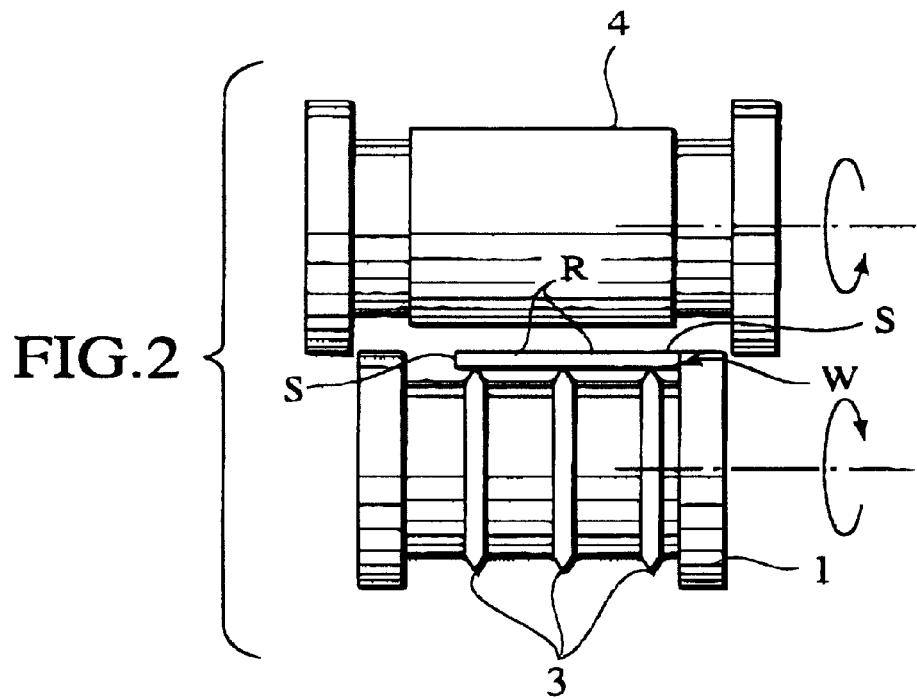
FIG. 2 is a right side explanatory diagram in FIG. 1.

FIGS. 1 to 5 show first and second preferred embodiments of the present invention. Particularly, FIGS. 1 and 2 show an outline of a ring cutting step, which shows a case where two rings are obtained by cutting a wide and endless ring work material.

As shown in FIGS. 1 and 2, a ring work material W is preliminarily formed in an endless shape by forming coil material such as maraging steel or the like having a thickness of 0.3 to 0.5 mm or so in an annular shape to connect both ends of the same in a welding manner, and it is placed in a cutting stage or step as it is.

In the cutting stage or step, a driving roll 1 and an idle roll 2 are prepared in a paired manner. The ring work material W is entrained between the driving roll 1 and the idle roll 2 and it is applied with a predetermined tension T to be moved in a circulating manner.

Three indentation punches 3 (disc cutters 3) with an angle-shaped edge are provided on the driving roll 1 coaxially and integrally therewith, and the ring work material W is rotated in a circulating manner while the indentation punches 3 are serving as contacting faces on the side of the driving roll 1. Then, an edge angle θ of each indentation punch 3 is an acute angle and it is set to an angle in a range of 50 to 80°.

Meanwhile, a pressing roll 4 with a real cylindrical shape (which is not an angle-shape edge) is provided above the driving roll 1, the ring work material W is cut to two rings R and R in the so-called two piece cutting system according to cooperation with the indentation punches 3 by pressing the pressing roll 4 against the driving roll 1.

In more detail, when the pressing roll 4 is pressed against the driving roll 1 with a predetermined pressure while the ring work material W which has been entrained between the driving roll 1 and the idle roll 2 is being moved in a circulating manner, the indentation punches 3 gradually bite the ring work material W in the course of several circulations so that the ring work material W is cut and separated into two rings R and R with a predetermined width size, and two end materials S and S positioned at both ends of the material.

Figure 3A:
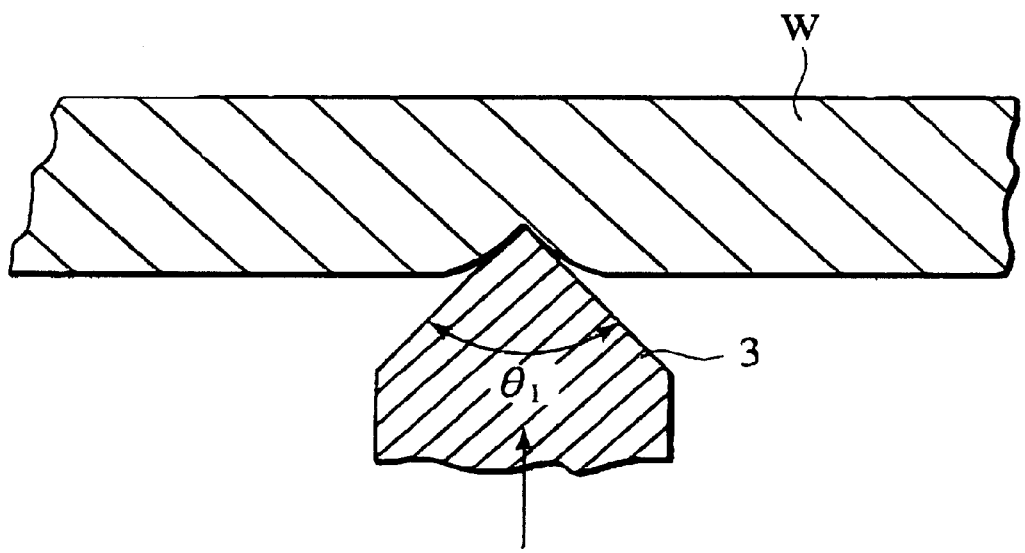
FIGS. 3A and 3B are enlarged sectional views of a main portion according to steps where a ring is cut in an indenting manner by an indentation punch.
Figure 3B:
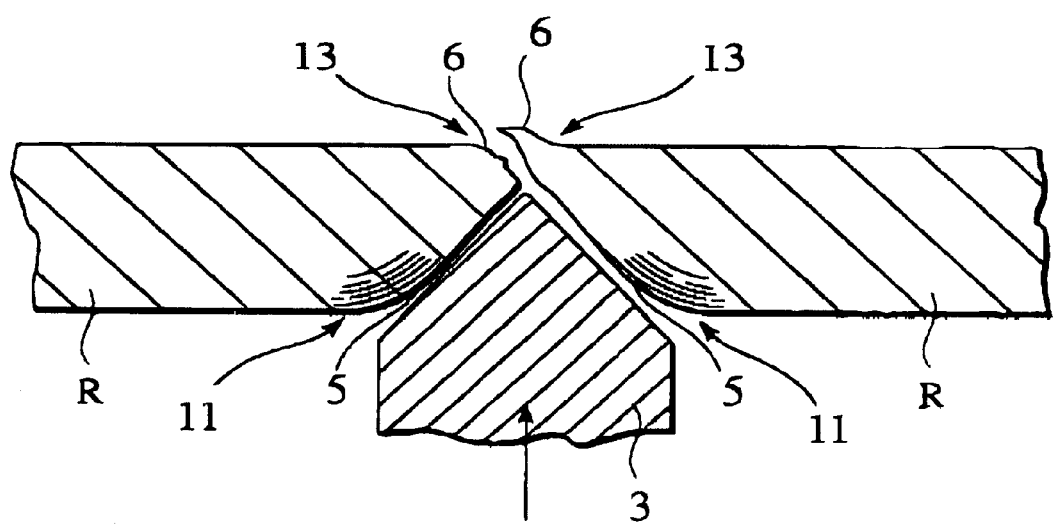

In the course where the ring work material W is cut, as shown in FIGS. 3A and 3B, an edge of the indentation punch 3 gradually bites the ring work material W from an inner peripheral face side so that the bitten portion of the work material W plastically deforms. The depth of the plastic deformation reaches more than ¾ of the thickness of the ring work material W (as shown in FIG. 3B). When the strength of the portion of the ring work material W corresponding to the bottom portion of the V groove reaches the limit according to advance of the biting, a rupture (fracture) occurs in the portion of the ring work material and the ring work material W separates to two rings R and R before the edge of the indentation punch 3 pieces an outer peripheral face side of the ring work material W. The thickness at the time of rupture is less than ¼ of the original thickness of the ring work material W (as shown in FIG. 3B). Accordingly, the fracture surface of the thickness of the work material W at the time of rupture is reduced as compared with the fracture surface occurring over the entire original thickness of the ring work material near to one point of a shearing start, so that the end materials S are improved in quality.

At this time, a "shear droop" due to plastic deformation caused by biting of the indentation punch 3 occurs in an inner peripheral side corner edge portion 11 of the ring R which has been separated by the indentation, so that a relatively large R chamfered portion 5 is formed on the inner peripheral side corner edge portion, thereby preventing a drawback factor such as a "burr" or the like from occurring. Simultaneously, the R chamfered portion 5 is increased in its mechanical strength owing to work hardening due to the plastic deformation. Meanwhile, a sharp "burr" 6 occurs at an outer peripheral side corner edge portion 13 of the ring R as a trace of rupture.

A barrel finishing work using compound is performed on the ring R which has been subjected to cutting work in this manner in order to remove the above "burr" 6. The barrel finishing work is performed by applying barrel energy uniformly to both the inner peripheral side corner edge portion and the outer peripheral side corner edge portion of the ring. Therefore, a mirror surface can be obtained.

Figure 4:
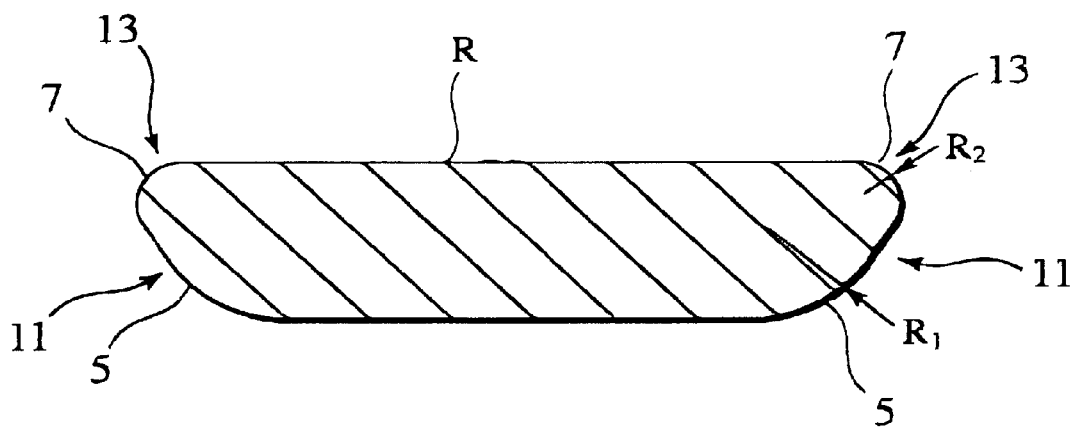
FIG. 4 is an enlarged sectional view of a ring which has been manufactured by a method of the present invention.

As a result, as shown in FIG. 4, the R chamfered portion 5 formed on the inner peripheral side corner edge portion of the ring by the "shear droop" which is the plastic deformation generated at the time of indentation cutting is finished smoothly on the basis of a predetermined curvature, and the "burr" which has occurred at the time of indentation cutting is completely removed from the outer peripheral side corner edge portion 13 of the ring, so that a R chamfered portion 7 has a radius of curvature $R_2$ smaller than a radius of curvature $R_1$ of the R chamfered portion 5 on the inner peripheral side corner edge portion 11 is formed on the outer peripheral side corner edge portion 13.

Since it is assumed that the R chamfered portion 5 on the inner peripheral side corner edge portion 11 is primarily formed by the plastic deformation at the time of indentation cutting, there is not any occurrence of a drawback factor of the "burr" 6, and the mechanical strength of the R chamfered portion 5 is improved owing to work hardening (forging hardening) according to the plastic deformation. As a result, a product which meets characteristics required for a ring for a CVT belt sufficiently can be obtained.

Here, the R chamfered portions 5 and 7 are respectively formed on both the inner peripheral side corner edge portion 11 of the ring R and the outer peripheral side corner edge portion 13 thereof by the above barrel finishing working. However, since the R chamfered portion 5 on the inner peripheral side corner edge portion of the ring has been primarily formed by the plastic deformation at the time of indentation cutting, the radius of curvature $R_1$ of the R chamfered portion 5 becomes larger than the radius of curvature $R_2$ of the R chamfered portion 7 necessarily when the former and the latter are compared with each other.

In this embodiment, since the ring R is cut in the indenting manner by the indentation punch 3 having an edge angle of 50 to 80°, as mentioned above, regarding the sizes of the respective R chamfered portions 5 and 7 after the barrel finishing working, the radius of curvature $R_1$ of the R chamfered portion 5 on the inner peripheral side corner edge portion is R 0.2 to 0.3 and the radius of curvature $R_2$ of the R chamfered portion 7 on the outer peripheral side corner edge portion is R 0.1 or so. It is preferable that the radius of curvature $R_1$ of the R chamfered portion 5 on the inner peripheral side corner edge portion is at least twice the radius of curvature $R_2$ of the R chamfered portion 7 on the outer peripheral side.

Figure 5:
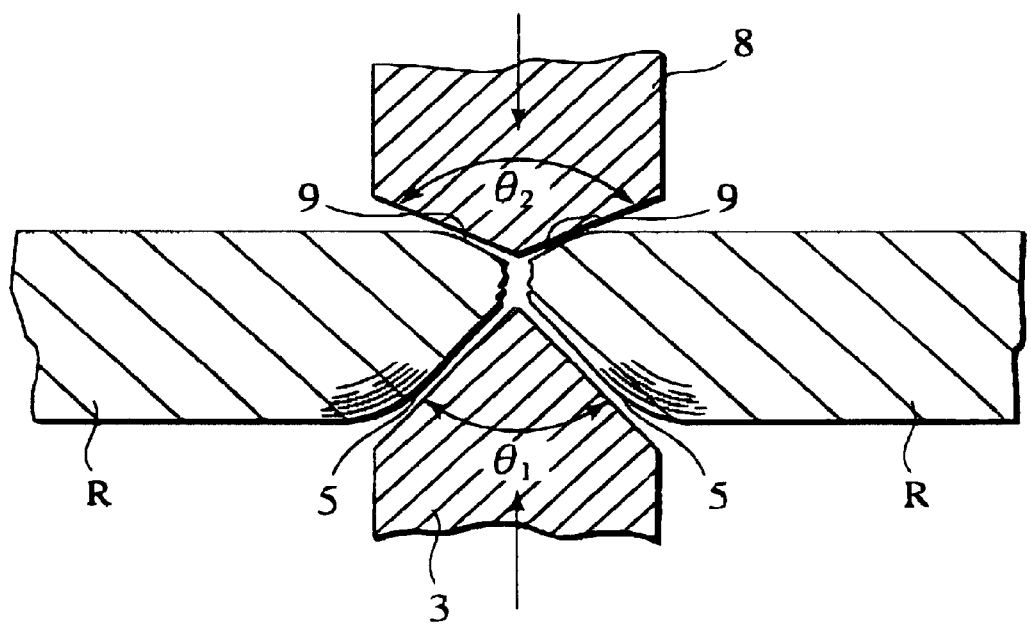
FIG. 5 is an enlarged sectional view of a main portion showing a second embodiment of the present invention.

FIG. 5 shows a second embodiment of the present invention. In this embodiment, besides the driving roll 1 side, indentation punches 8 are also provided on the pressing roll 4 side. Therefore, this embodiment is different in a structure where the ring R is cut in an indenting manner from the above and below from the first embodiment.

In more detail, an indentation punch with an edge angle of 50 to 80° is used as the indentation punch 3 on the driving roll 1 side like the first embodiment, while an indentation punch 8 with an obtuse edge angle $\theta 2$ (for example, 120°) is used on the pressing roll 4 side, so that the upper and lower indentation punches 3 and 8 bite the ring work material W from both the inner peripheral side and the outer peripheral side thereof to cut the same in an indenting manner while the ring work material W is moving in a circulating manner.

In this case, the R chamfered portion 5 having a large radius of curvature is formed on the inner peripheral side corner edge portion which the acute angle indentation punch 3 bites owing to the "shear droop" due to the plastic deformation, and simultaneously the R chamfered portion 9 having a small radius of curvature is formed on the outer peripheral side corner edge portion which the obtuse angel indentation punch 8 bites owing to the "shear droop" due to the plastic deformation.

Then, a barrel finishing work is performed on the ring R in the subsequent step like the first embodiment, so that the ring R having the R chamfered portion 5 with a large radius of curvature on the inner peripheral side corner edge portion and the R chamfered portion 9 with a small radius of curvature on the outer peripheral side corner edge portion is formed in the same manner as that in FIG. 4.

In general, a metal belt constituted by rings is used under severe conditions, for example, as the CVT belt, where a load acting on the outer peripheral side portion of the ring is larger than a load acting on the inner peripheral side portion thereof. Accordingly, it is important in view of improvement in durability of the ring itself that the above-mentioned drawback factor such as a "burr" or the like does not remain on the inner peripheral side portion of the ring.

The ring for a laminated type metal belt according to the present invention meets these demands sufficiently, where the radius of curvature of the chamfered portion at the inner peripheral side corner edge is positively set to be larger than that at the outer peripheral corner edge.

Therefore, for example, when a drawback factor such as a "burr" or the like simultaneously occurs at both the inner and outer peripheral side corner edges in a cutting stage of a ring, since the radius of curvature of the chamfered portion on the inner peripheral side of the ring is larger than that on the outer peripheral side, the burr on the inner peripheral side can be removed more securely than the burr on the outer peripheral side. As a result, the durability and reliability of the ring itself can be improved.

In other wards, even when the drawback factor such as the "burr" or the like occurs on inner and outer peripheries of the ring which is in the pre-working stage or the work material state, the drawback factor can more securely be removed from the inner periphery of the ring which is subjected to large load in the practical use in proportion to the magnitude of the radius of curvature of the chamfered portion on the inner peripheral side of the ring. Therefore, stress concentration or the like due to remaining of the drawback factor can be avoided, and the durability and reliability of the ring itself can be improved significantly. In particular, when the radius of curvature of the chamfered portion on the inner peripheral side of the ring is set to be at least twice the on the outer peripheral side thereof, as defined in the second aspect, the advantage or merit of the invention is further increased.

On the other hand, the method to manufacture a ring for a laminated type metal belt described above, when the ring is cut out from the ring work material by cooperation of the indentation punch with an angle-shaped edge and the pressing roll, so-called indentation method, the indentation punch bites the ring work material from the inner peripheral side towards the outer peripheral side. Therefore, the so-called smooth "shear droop (roll over)" region occurs on a cut surface of the inner peripheral side of the ring due to plastic flow (plastic deformation) and the ring is ruptured from the ring work material just before the indentation punch pieces the ring work material to the outer peripheral side. Then, since the ring is separated from the ring work material by the rupture, a burr can not be prevented from occurring on the outer peripheral side corner edge. However, since the "shear droop" due to the plastic deformation occurs on the inner peripheral side corner edge portion of the ring, the radius of curvature of the inner peripheral side corner edge of the ring becomes larger than that of the outer peripheral side corner edge thereof necessarily, and occurrence of the drawback factor such as a "burr" is suppressed.

In this case, mechanical strength on the inner peripheral side corner edge of the ring is also improved owing to work hardening due to the plastic deformation.

Then, when a barrel finishing work is performed on the ring as a polishing step following the cutting step and chamfering energy is evenly applied to the respective inner and outer peripheral corner edge portions, the "shear droop" region on the inner peripheral side corner edge portion is more smoothly finished and the drawback factor such as "burr" or the like is completely removed from the outer peripheral side corner edge portion of the ring so that the outer peripheral side corner edge portion is rounded in a R chamfered shape. Particularly, the inner peripheral side corner edge portion of the ring is finished as a chamfered portion having the radius of curvature larger than that of the outer peripheral side corner edge portion.

In other wards, since the ring is cut out from the ring work material by cooperation of the indentation punch with an angle-shape edge and the pressing roll and then such a polishing working as a barrel finishing working or the like is performed on the inner and outer peripheral side corner edge portions of the cut-out ring, the radius of curvature of the inner peripheral side corner edge portion of the ring can be made larger than that of the outer peripheral side corner edge portion thereof in the stage of the cutting working step, and a desired ring can easily be manufactured by merely applying chamfering energy to the respective outer and inner peripheral side of the ring equally in the polishing working step which is the subsequent step and reduction in manufacturing cost can be achieved. In addition, work hardening is promoted on the inner peripheral side corner edge portion of the ring owing to plastic flow due to the indentation punch. Furthermore, mechanical strength of the inner peripheral side of the ring to which a load larger than that acting on the outer peripheral side is applied can be improved.

The manufacturing method is directed for making the curvature of the inner peripheral side corner edge of the ring larger than that of the outer peripheral side corner edge thereof positively. Accordingly, it is preferable that the edge angle of the indentation punch with an angle-shaped edge is acute, especially it is in a range of 50 to 80°.

Particularly, since the edge angle of the indentation punch with the angle-shaped edge is set in a range of 50 to 80°, such an effect or advantage can be obtained that the inner peripheral side corner portion of the ring can easily be worked to a predetermined curvature in the stage of the cutting working step.

Also, various polishing working processes can be employed for the polishing step following the cutting step, but it is preferable that a barrel finishing working suitable for mass production is employed as the polishing working step.

In this connection, since the barrel finishing work is performed on the ring as the polishing work on the ring which has been cut, such an effect or advantage can be obtained that productivity can be improved and reduction in manufacturing cost can further be improved.

The entire contents of Japanese Patent Application P2000-52824 (filed on Feb. 29, 2000) are incorporated herein by reference.

Although the invention has been described above by reference to certain embodiments of the invention, the invention is not limited to the embodiments described above. Modifications and variations of the embodiments descried above will occur to those skilled in the art, in light of the above teachings. The scope of the invention is defined with reference to the following claims.

What is claimed is:

1. A method to manufacture a ring for a laminated type metal belt, comprising the steps of:

entraining a wide and endless ring work material between one roll provided with an indentation punch having an angle-shaped edge and another roll to move the ring work material in a circulating manner;

pressing a pressing roll on to the indentation punch so as to sandwich the ring work material;

cutting the ring work material by indentation action of the indentation punch to obtain a ring with a predetermined width size so that an inner peripheral corner edge of the ring is formed into a chamfered portion in the cutting step; and performing a polishing working on an outer peripheral corner edge portion of the ring which has been cut in the cutting step so that an outer peripheral corner edge of the ring is formed into another chamfered portion in the polishing step.

2. A method to manufacture a ring for a laminated type metal belt according to claim 1, further comprising the step of:

laminating a plurality of the rings so as to manufacture a laminated type metal belt.

3. A method to manufacture a ring for a laminated type metal belt according to claim 1, wherein the edge angle of the indentation punch is in a range of 50 to 80°.

4. A method to manufacture a ring for a laminated type metal belt according to claim 3, further comprising the step of:

laminating a plurality of the rings so as to manufacture a laminated type metal belt.

5. A method to manufacture a ring for a laminated type metal belt according to claim 1, wherein the polishing working is a barrel finishing working.

6. A method to manufacture a ring for a laminated type metal belt according to claim 5, further comprising the step of:

laminating a plurality of the rings so as to manufacture a laminated type metal belt.

7. A method to manufacture a ring for a laminated type metal belt according to claim 1, wherein the radius of curvature of the chamfered portion of the inner peripheral corner edge of the ring is set to be larger than the radius of curvature of the chamfered portion of the outer peripheral corner edge of the ring.

8. A method to manufacture a ring for a laminated type metal belt according to claim 7, further comprising the step of:

laminating a plurality of the rings so as to manufacture a laminated type metal belt.

* * * * *